United States Patent [19]

Romine

[11] Patent Number: 4,750,992

[45] Date of Patent: Jun. 14, 1988

[54] CLASSIFICATION OF ALUMINA PARTICLES

[75] Inventor: James C. Romine, West Grove, Pa.

[73] Assignee: E. I. Du Pont de Nemours and Company, Wilmington, Del.

[21] Appl. No.: 849,875

[22] Filed: Apr. 9, 1986

[51] Int. Cl.$^4$ .............................. B03D 3/00; C01F 7/02
[52] U.S. Cl. ........................................ 209/5; 209/209; 209/173; 423/625
[58] Field of Search .................... 209/208, 209, 173, 5; 423/625, 111, 131

[56] References Cited

U.S. PATENT DOCUMENTS

| | | | |
|---|---|---|---|
| 2,999,586 | 9/1961 | Keith | 209/5 |
| 3,630,351 | 12/1971 | Uhinich | 209/5 |
| 3,808,015 | 5/1972 | Seufert | 106/65 |
| 4,055,509 | 9/1977 | Weimer | 423/625 |
| 4,360,449 | 11/1982 | Oberlander | 423/625 |
| 4,443,553 | 9/1982 | Chiang et al. | 502/68 |

Primary Examiner—Kenneth M. Schor
Assistant Examiner—Thomas M. Lithgow

[57] ABSTRACT

Classification of alumina particulate is achieved through use of a basic aluminum compound as a dispersant.

5 Claims, No Drawings

CLASSIFICATION OF ALUMINA PARTICLES

BACKGROUND OF THE INVENTION

Certain ceramic processes require alumina of a specified range of particle size as a primary raw material. This invention provides a process for obtaining the particle size distribution required to produce satisfactory product in a more efficient and economical manner.

Classification of alumina, which is separation according to particle size, is presently done by gravity sedimentation from an aqueous dispersion. Typically, the alumina is placed in water to which hydrochloric acid has been added. In one recipe, the weight percentage of alumina is initially 15% and the pH is 4.0. The hydrochloric acid stabilizes the dispersion of the alumina. If the pH is inadvertently changed by more than about 0.5 units either way, the alumina flocculates rapidly.

A properly prepared alumina dispersion is quite stable, as the individual alumina particles are held apart by electrostatic forces and do not form large agglomerates which settle quickly. In such a stabilized dispersion, the particles settle very slowly under the influence of gravity with the larger particles settling more rapidly. This is the basis for the classification process.

SUMMARY OF THE INVENTION

This invention provides an improved process for classifying particles of alumina which comprises combining in an aqueous medium, alumina particles, a substantial proportion of which have a particle size of up to 5 microns and a sufficient amount of a basic aluminum salt having a basicity of from 0.33 to 0.83 to form a stable dispersion of the alumina particles of up to 5 microns, allowing the dispersion to settle into a continuum of regions of progressively increasing concentration of larger particles and removing a fraction of the continuum containing the desired range of particle size.

DETAILED DESCRIPTION OF THE INVENTION

In accordance with the present invention it has been found that a sedimentation classification (fractionation) process for particulate alumina can be greatly enhanced through the use of a basic aluminum salt having a basicity of from 0.33 to 0.83. The process has particular advantage in classifying particulate alumina of up to 5 micron particle size. Larger particles may of course be present, some of which may be so large as not to disperse but to settle almost immediately. From a practical standpoint however, one would through use of this process, classify only those particulate alumina mixtures having a substantial proportion, preferably at least 50% by weight of particles of up to 5 microns. Most benefit has been obtained with particulate mixtures wherein substantially all of the particles are less than 5 microns and at least about 85% by weight are less than 1 micron.

By particle size is meant the fundamental or ultimate size of the particle beyond which it does not readily break-up or disperse.

At least 15% by weight of particulate alumina based on the aqueous medium is ordinarily used in the classification process. Amounts of up to 75% by weight may be employed. Other oxides such as silica may be present in the particulate mixtures but at least 80% by weight and preferably 100% by weight should be alumina.

The basic aluminum salt employed as dispersant in this invention may be, for example, aluminum chlorohydroxide, basic aluminum nitrate or basic aluminum chloroacetate. Aluminum chlorohydroxide is most preferred and its basicity should preferably be between 0.79 and 0.83. The basicity of the aqueous phase is calculated by dividing the total equivalents of hydroxyl anions by the total equivalents of anions in the aqueous phase. Thus, aluminum chlorohydroxide of the formula $AL_2(OH)_5Cl\ 2H_2O$ (the water of hydration may vary) has a basicity of five-sixths or 0.833. It can be obtained as Chlorhydrol® from Reheis Chemical Company. This can be adjusted by the addition of HCl or $AlCl_3$.

As mentioned above, the basic aluminum salt is added in an amount sufficient to achieve a stable dispersion, by which is meant a dispersion which, after two hours shows no visible deposition of particles on the bottom of a container holding the dispersion and even after 24 hours has some particles in suspension. Certain of the dispersants in amounts as small as 0.1% by weight based on the aqueous medium have been found adequate to form a stable dispersion of the alumina particles. The pH of the stable dispersions is generally found to be between about 5 and 7. The dispersion is observed as a milky phase with little or no clear liquid at the upper surface.

Once the stable dispersion has been formed, it is allowed to settle. The time allowed for settling will of course depend on the degree of classification desired. Obviously a longer settling time will permit greater classification. As a practical matter, one starts with knowledge of the particle size distribution desired and removes the layer(s) containing such fraction after a period of time sufficient to allow a substantial proportion of the desired fraction to be separated by gravity from the remainder of the alumina particles. An advantage of the present process is that it permits a greater proportion of alumina solids to be present in the dispersion to be classified than does hydrochloric acid. It also permits a stable dispersion to be prepared over a wider range of pH conditions than dispersions made with hydrochloric acid. Lastly, with the present invention one may separate a greater proportion of a desired fraction within a given period of time thereby resulting in greater yields.

Test Procedures

A SediGraph method is used for determination of particle size distribution in the alumina. The SediGraph 5000 Particle Size Analyzer (Micromeritics Instrument Corp. of Norcross, Ga.) measures the sedimentation rates of particles in suspension and automatically presents these data as a cumulative percent finer distribution in terms of the Stokesian or equivalent spherical diameter in microns. The instrument determines by means of a finely collimated beam of X-rays, the concentration of particles remaining at decreasing sedimentation depths as a function of time. The specific procedures employed herein involves stirring the sample overnight and then subjecting it to 30 sec. of sonication using a Tekmar Ultrasonic Disrupter. The SediGraph instrument is calibrated with distilled water which has been adjusted to a pH of 4.0 using HCl. After the instrument is zeroed, the sample is pipetted into the sample reservoir until the detector exceeds 100% of scale. The scale adjustment is used to return the recorder pen to 100% and the sample is scanned to produce a graph which represents the particle size distribution.

The following examples are illustrative of this invention and are not intended as limiting.

EXAMPLE 1

Chlorhydrol® Powder was dissolved in deionized water to a concentration of 0.5%. To this solution was added 15 weight percent particulate alumina $Al_2O_3$-99.5+ (Alcoa A16-SG). In this mixture all particles were under 5 microns with 90% being 1 micron or less. The mixture was stirred for 1 hr. and was then placed in a 1000 ml graduated cylinder to the full mark. Observations were made after 2 and 19 hrs. A parallel experiment was conducted using the same component except for the omission of the aluminum chlorhydroxide dispersant. The observations showed that after 2 hrs. the mixture containing dispersant had settled to the 2-3 ml mark in the cylinder while the mixture which did not contain dispersant had already settled to the 250 ml mark. After 19 hrs. the first mixture had settled to 5 ml while the second remained at 250 ml. These observations indicate that the alumina slurry containing dispersant was a stable dispersion while an identical mixture without dispersant flocculates almost immediately and is therefore not stable. The experiment was repeated and the results were similar. A sample was removed from the dispersant-containing mixture after 19 hrs. from a level in the cylinder one inch below the liquid surface. This sample was analyzed for alumina content which was found to be 6.76% and also for particle size distribution by SediGraph. SediGraph measurement showed that 100% of the particles were below 1 micron in size and that 95% were below 0.7 micron.

EXAMPLE 2

An experiment was designed to determine the settling rate of alumina in dispersions. A 48 inch column was fabricated where eight valves were located at six inch intervals down the column except for the eighth valve which was 4.5 inch below the seventh. To avoid valve pluggage, the valves were flushed before removing the test samples. In this experiment, 18.3 liters of an aqueous mixture containing 15% alumina (A16-SC) and 0.5% Chlorhydrol® Powder were placed in the sedimentation column. Samples were removed from each of the eight valves periodically and were analyzed for alumina content (expressed as % by weight) and particle size distribution. The results of this experiment are shown in Table I. In a substantially identical procedure, the aluminum chlorhydroxide dispersant was omitted and hydrochloric acid (to provide a pH of 4) was substituted as the dispersing agent. The results of this experiment are shown in Table II.

TABLE I

| Depth (In.) | Sedimentation Time (Hrs) | | | |
|---|---|---|---|---|
| | 0 | 113.5 | 161.5 | 209.5 |
| 6 | 15 | 7.1 | 4.7 | 1.8 |
| 12 | 15 | 8.6 | 7.8 | 6.8 |
| 18 | 15 | 9.2 | 8.8 | 8.1 |
| 24 | 15 | 9.6 | 9.4 | 9. |
| 30 | 15 | 9.6 | 9.5 | 9.4 |
| 36 | 15 | 10.1 | 10. | 9.6 |
| 42 | 15 | 10. | 10.1 | 9.9 |
| 48 | 15 | 10.1 | | |

TABLE II

| Depth (In.) | Sedimentation Time (Hrs) | | | | | |
|---|---|---|---|---|---|---|
| | 0 | 48 | 72 | 120 | 204 | 403 |
| 6 | 15 | 13.6 | 10 | 5.5 | 0.03 | 0 |
| 12 | 15 | 14.6 | 13.3 | 11.5 | 8.1 | 4.1 |
| 18 | 15 | 14.9 | 14.5 | 13.7 | 11.5 | 8.9 |
| 24 | 15 | 15.1 | 14.8 | 14.5 | 12.9 | 11. |
| 30 | 15 | 15.2 | 15. | 14.8 | 14.3 | 12.3 |
| 36 | 15 | 15.4 | 15.5 | 15.4 | 14.1 | 15.3 |
| 42 | 15 | 15.3 | 15.8 | 15.6 | 14.9 | 13.4 |
| 48 | 15 | 15.4 | 16.2 | 16.5 | 15.3 | 14.5 |

The number in the tables, other than the depth and sedimentation times, refer to concentration in weight percent of alumina. It should be noted that while Table II indicates that a greater weight percent of alumina particles remain dispersed and can be collected through use of HCl versus aluminum chlorohydroxide, the particle size distribution was acceptable only to the depths and time periods in the box in each table. The guideline for acceptability selected is that 100% of the particles be below 1 micron in size and that 95% be below 0.7 microns. Thus, it can be seen, from the example, that after 113.5 hours, with the process of the invention (Table I), one obtains over 8 times as much classified material of acceptable particle size as is obtained after 120 hours with the addition of HCl (Table II).

EXAMPLE 3

A series of experiments were designed to define the limits of the operation of the technology. Small samples of alumina (A16-SC) in water were prepared at different solids levels and with different concentrations of dispersant. These samples were allowed to stand and observations were made two hours after preparation as to the qualitative stability, dispersed (DISP) or flocculated (FLOC), of the dispersions. pH measurements were also made. The following experiments were conducted:

1. Alumina (15%-65% by wt.), Chlorhydrol® Powder (0.1%-5.0%). Results in Table III.
2. Alumina (25%-75% by wt.), Chlorhydrol® Powder (0.5%-5.0%). Results in Table IV.
3. Alumina (15%-50% by wt.), aluminum chlorohydroxide (⅔ basic). Results in Table V.

TABLE III

| Alumina Solids (%) | Dispersant Concentration (%) | | | |
|---|---|---|---|---|
| | 0.1 | 0.5 | 1 | 5 |
| 15 | DISP 7.09 | DISP 5.61 | DISP 5.09 | DISP 4.65 - pH |
| 25 | FLOC 8.57 | DISP 5.89 | DISP 5.53 | FLOC 4.75 - pH |
| 50 | FLOC 9.85 | DISP 6.67 | DISP 5.87 | FLOC 5.02 - pH |
| 65 | FLOC 10.14 | FLOC 7.14 | DISP 6.11 | FLOC 5.08 - pH |

TABLE IV

| Alumina Solids (%) | Dispersant Concentration (%) | | | | |
|---|---|---|---|---|---|
| | 0.5 | 1 | 2 | 3 | 5 |
| 25 | DISP 5.87 | DISP 5.49 | DISP 5.09 | DISP 4.94 | DISP 4.74 - pH |
| 50 | DISP 6.67 | DISP 5.9 | DISP 5.46 | DISP 5.24 | DISP 4.95 - pH |
| 65 | FLOC 7.43 | DISP 6.12 | DISP 5.62 | DISP 5.36 | DISP 5.06 - pH |
| 75 | FLOC | DISP | DISP | DISP | DISP |

TABLE IV-continued

| Alumina Solids (%) | Dispersant Concentration (%) | | | | |
|---|---|---|---|---|---|
| | 0.5 | 1 | 2 | 3 | 5 |
| | 7.8 | 5.46 | 5.71 | 5.46 | 5.14 - pH |

TABLE V

| Alumina Solids (%) | Dispersant Concentration (%) | | |
|---|---|---|---|
| | 0.1 | 0.05 | 1 |
| 15 | DISP 6.17 | DISP 4.46 | DISP 4.32 - pH |
| 25 | FLOC 7.43 | DISP 4.77 | DISP 4.48 - pH |
| 50 | FLOC 9.86 | DISP 5.84 | DISP 4.96 - pH |

A further series of experiments similar to the first series in this example was run employing a different commercial alumina particulate, Reynolds Chemicals RC-HPFDBM. It is described as 92% alpha alumina having a surface area of 8-10 m²/gm and a median crystal size of 0.5. In the particle size distribution, 1% was 5 microns and less than 10 microns. All the rest was less than 5 microns.

4. Alumina (15%-50% by wt.), Chlorohydrol® Powder (0.1%-5.0%). Results in Table VI.

5. Alumina (15%-50% by wt.), aluminum chlorohydroxide (⅔ basic). Results in Table VII.

TABLE VI

| Alumina Solids (%) | Dispersant Concentration (%) | | |
|---|---|---|---|
| | 0.1 | 0.05 | 1 |
| 15 | DISP 5.6 | DISP 5.07 | DISP 4.97 - pH |
| 25 | DISP 5.9 | DISP 5.26 | DISP 5.03 - pH |
| 50 | DISP | DISP | DISP |

TABLE VI-continued

| Alumina Solids (%) | Dispersant Concentration (%) | | |
|---|---|---|---|
| | 0.1 | 0.05 | 1 |
| | 6.21 | 5.67 | 5.37 - pH |

TABLE VII

| Alumina Solids (%) | Dispersant Concentration (%) | | |
|---|---|---|---|
| | 0.1 | 0.05 | 1 |
| 15 | DISP 4.15 | DISP 4.07 | DISP 4.12 - pH |
| 25 | DISP 4.17 | DISP 4.31 | DISP 4.24 - pH |
| 50 | DISP 5.67 | DISP 4.58 | DISP 4.42 - pH |

I claim:

1. An improved process for classifying particles of alumina which comprises, combining in an aqueous medium, alumina particles, a substantial proportion of said alumina particles have a particle size of up to 5 microns and a sufficient amount of a basic aluminum salt having a basicity of from 0.33 to 0.83 to form a stable dispersion of the alumina particles of up to 5 microns, allowing the dispersion to settle into a continuum of regions of progressively directionally downwardly increasing concentration of larger particles and removing a fraction of the continuum containing the desired range of particle size while retaining other fractions of said continuum which do not contain the desired range of particle size.

2. A process according to claim 1 wherein the basic aluminum salt is aluminum chlorohydroxide.

3. A process according to claim 1 or 2 wherein all the particles to be classified are less than 5 microns.

4. A process according to claim 3 wherein the stable dispersion contains up to 75% by weight of particulate alumina.

5. A process according to claim 4 wherein the pH of the stable dispersion is between 5 and 7.

* * * * *